(12) United States Patent
Suzuki et al.

(10) Patent No.: US 8,019,973 B2
(45) Date of Patent: Sep. 13, 2011

(54) INFORMATION PROCESSING APPARATUS AND METHOD OF CONTROLLING REGISTER

(75) Inventors: Takashi Suzuki, Kawasaki (JP); Toshio Yoshida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/638,764

(22) Filed: Dec. 15, 2009

(65) Prior Publication Data
US 2010/0095093 A1     Apr. 15, 2010

Related U.S. Application Data

(63) Continuation of application No. PCT/JP2007/000659, filed on Jun. 20, 2007.

(51) Int. Cl.
*G06F 9/312* (2006.01)
*G06F 9/52* (2006.01)
(52) U.S. Cl. .......................... 712/215; 712/228
(58) Field of Classification Search .................. 712/215, 712/228
See application file for complete search history.

(56) References Cited

U.S. PATENT DOCUMENTS

| | | | | |
|---|---|---|---|---|
| 6,553,487 | B1* | 4/2003 | Sukonik et al. | 712/228 |
| 6,694,347 | B2* | 2/2004 | Joy et al. | 718/108 |
| 7,143,412 | B2* | 11/2006 | Koenen | 718/102 |
| 7,426,630 | B1* | 9/2008 | Chong et al. | 712/228 |
| 2006/0020776 | A1* | 1/2006 | Yoshida | 712/235 |
| 2006/0020777 | A1 | 1/2006 | Suzuki et al. | |

FOREIGN PATENT DOCUMENTS

| | | |
|---|---|---|
| EP | 1 621 999 A1 | 2/2006 |
| EP | 1 622 000 A2 | 2/2006 |
| JP | 2003-196086 | 7/2003 |
| JP | 3646137 | 2/2005 |
| JP | 2006-39815 | 2/2006 |
| JP | 2006-39874 | 2/2006 |
| JP | 2006-99719 | 4/2006 |

OTHER PUBLICATIONS

International Search Report issued Jun. 20, 2007 in corresponding PCT/JP2007/000659.*
Nobuyuki Yamasaki, "Responsive Multithread Processor for Distributed Real-Time Processing", Oriceedubgs of the International Workshop on Innovative Architecture for Future Generation High Performance Processors and Systems, IEEE, Jan. 1, 2006, pp. 44-56.
Ana Sonia et al., "A Power Efficient High-Throughput 32-Thread SPARC Processor", IEEE Journal of Solid-State Circuits, IEEE Service Center, Piscataway, NJ, vol. 42, No. 1, Jan. 2007, pp. 7-16.
European Search Report dated Aug. 2, 2010 and issued in corresponding European Patent Application 07790185.8.

* cited by examiner

*Primary Examiner* — Daniel Pan
(74) *Attorney, Agent, or Firm* — Fujitsu Patent Center

(57) ABSTRACT

An information processing apparatus and a method of controlling the same that employs a register window system and a Simultaneous Multithreading method for reducing circuit areas by sharing a data transfer bus between threads, said bus connecting a master register and a work register provided for each thread and for avoiding interference in instruction execution with other threads caused by a conflict between accesses to a register between threads. An information processing apparatus and a method of controlling the information processing apparatus employing a register window system for register reading, in which a master register and a work register are held for each thread and a bus for transferring data from the master to the work register is shared by threads in order to realize Simultaneous Multithreading.

12 Claims, 10 Drawing Sheets

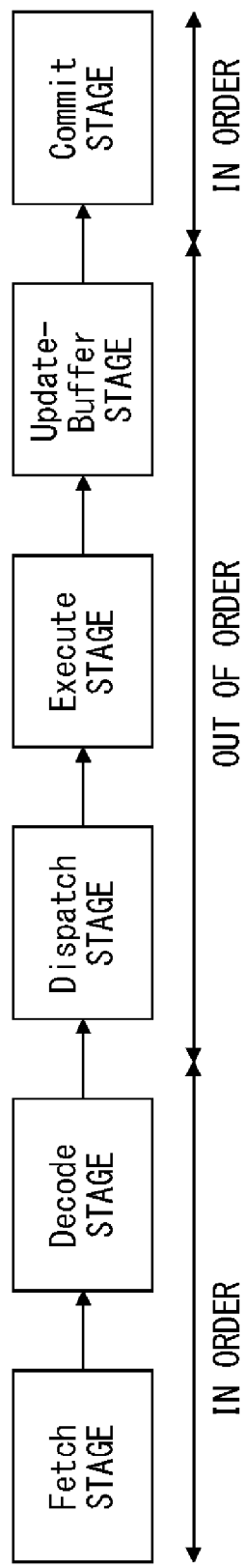
F I G. 2

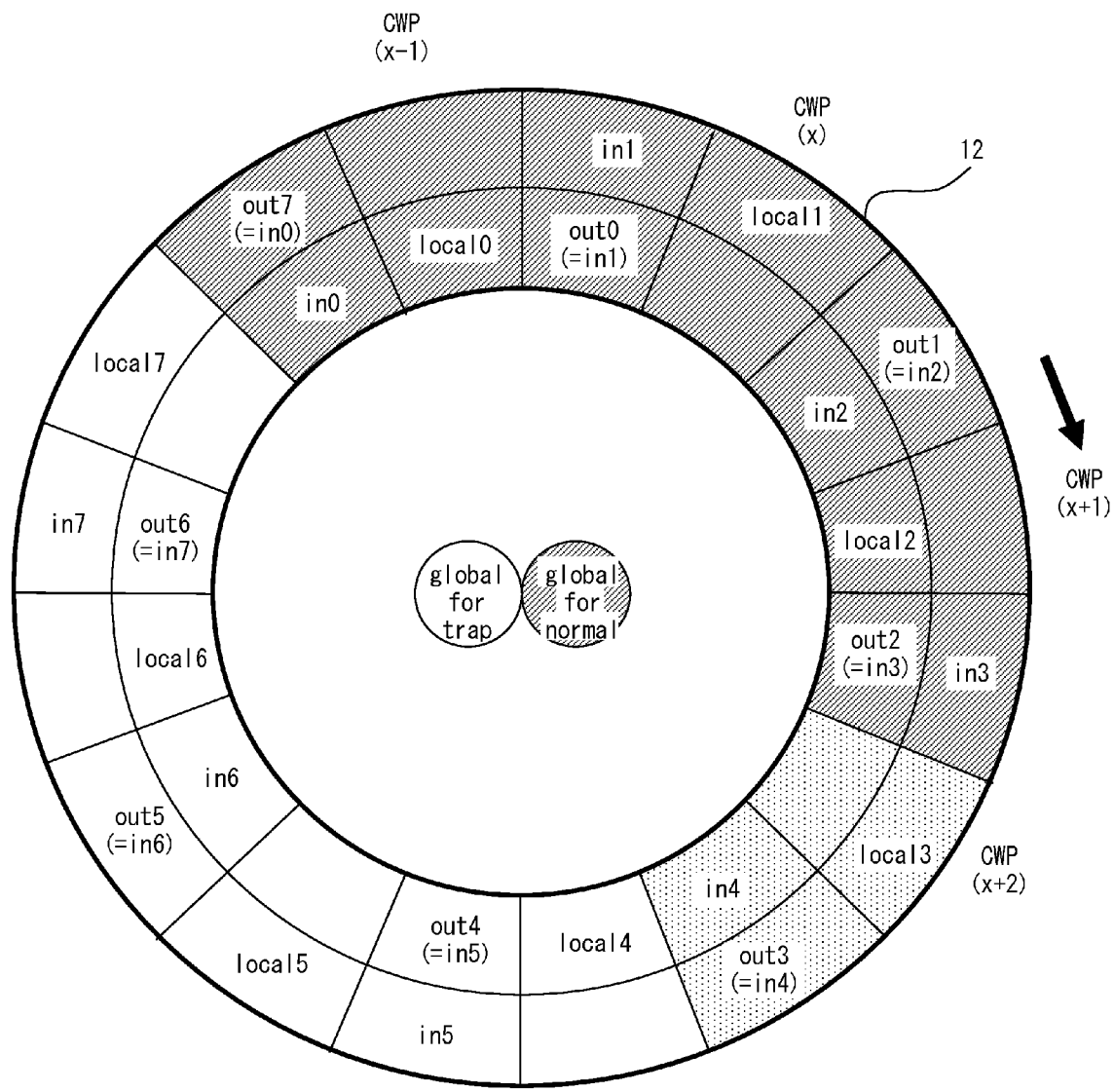
F I G. 3

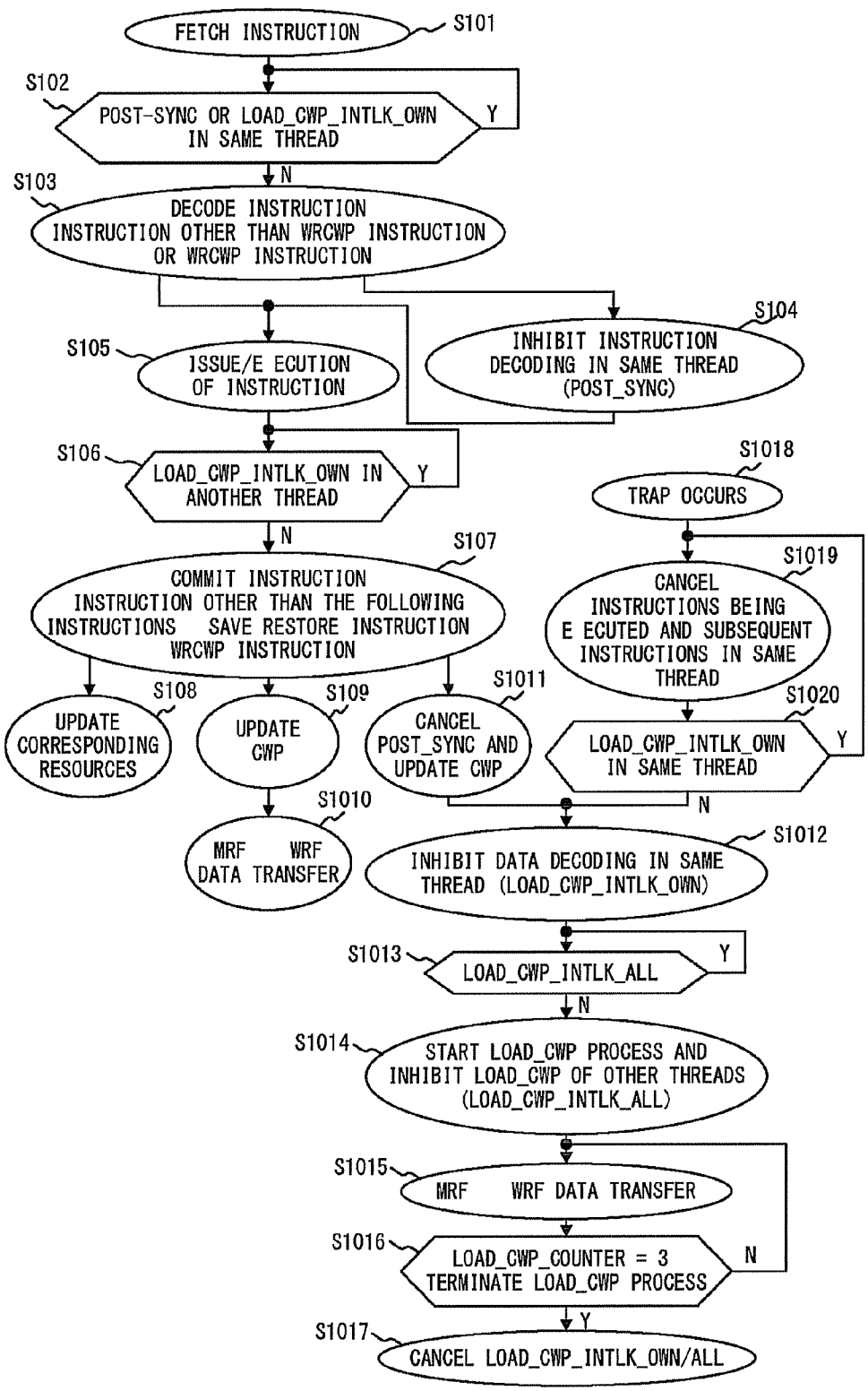
F I G. 1 0

INFORMATION PROCESSING APPARATUS AND METHOD OF CONTROLLING REGISTER

CROSS-REFERENCE TO RELATED APPLICATIONS

This application is a continuation application of International PCT Application No. PCT/JP2007/000659 which was filed on Jun. 20, 2007.

FIELD

The present invention relates to an information processing apparatus adopting a register window system for executing Simultaneous MultiThreading, and to a method of controlling the same.

BACKGROUND

In recent years, a register window system has been suggested as a configuration of general-purpose registers used in information processing apparatuses. This aims at provision of plural register sets (windows) in order to eliminate the need to save and restore information between registers and memory devices, which results when subroutines are called or returned.

However, when an immense number of windows are used, data cannot be read from a register onto an execution unit at high speed, which is problematic. In order to cope with this problem, a method is suggested in which a window that is currently referred to among general-purpose registers is held as a work register and this work register is made to operate as if it is cache memory in order to reduce time loss in reading or writing information that might result, depending upon size.

However, a configuration in which only 1 window that is being referred to currently is held as a work register requires that data be transferred to the work register each time the window is switched. Because data that should be referred to during the transfer does not exist, subsequent instructions cannot be executed until the data transfer is terminated.

This configuration results in severe degradation in performance of information processing apparatuses in which a large number of simultaneous instructions are issued using an out-of-order instruction execution method, wherein the order of executing instructions is changed so that execution of instructions starts from those that have become ready to be executed regardless of the execution order in the program.

Accordingly, in information processing apparatuses using an out-of-order instruction execution method, a large number of instructions are stored in a buffer and are executable instructions; such instructions are executed after changing the execution order that was specified by the program so that the throughput of the instructions is improved.

However, in the above configuration, the execution order of instructions cannot be changed before or after window switching, and thus executions of all instructions stored subsequently to the switching are required to wait, and this prevents an out-of-order execution method from functioning.

Patent Document 1 proposed a method in which plural windows are held as a work register in order to solve the above problem. Using this method, windows adjacent to the window that is being referred to are held as a work register set, and thereby subsequent instructions can be executed without waiting for data transfer when windows are switched successively.

Also, it is generally known that recent information processing apparatuses adopt a superscalar method, by which processes of computations are parallelized as much as possible so as to increase efficiency in using respective execution units so that all aspects of the performance are improved.

However, not all execution units operate in an information processing apparatus adopting a superscalar method, and there is a problem in that the parallelism is not fully utilized. Thus, Simultaneous MultiThreading (SMT) is suggested as a method by which resources (peripheral circuits such as computing units and data transfer buses) that are not fully utilized by a single thread can be distributed to plural threads so that the inherent parallelism of an information processing apparatus can be utilized at a maximum.

As a solution to realization of SMT, it is conceivable to simply increase the number of resources in accord with the number of threads. This means that 2 SMTs are configured using twice as many resources as a single thread. In such a case, there is no conflict between threads that are accessing the same resources. However, an increase in the number of threads immensely increases the number of necessary resources, which reduces efficiency in using such resources. This works against the inherent purpose of SMT.

In this situation, a configuration is required in which resources are partially commoditized so that an increase in the number of resources can be suppressed and the efficiency in using such resources can be increased. Also, partial commoditization of resources causes a problem in which a conflict between different threads accessing common resources interferes with instruction executions in other threads.

Patent Document 1: Japanese Laid-open Patent Publication No. 2003-196086

SUMMARY

In view of the above situation, it is an object of the present invention to provide an information processing apparatus and a method of controlling the same that employs a register window system and a Simultaneous Multithreading method for reducing circuit areas by sharing a data transfer bus between threads, said bus connecting a master register and a work register provided for each thread and for avoiding interference in instruction execution with other threads caused by a conflict between accesses to a register between threads.

One aspect of the present invention is an information processing apparatus of a register window system for executing Simultaneous MultiThreading, including a register set in which a master register and a work register are provided for plural threads and which includes a data transfer bus shared between the threads for transferring data from the master register to the work register, an instruction analysis unit for decoding an instruction read from a memory device, an instruction issue control unit for performing control to issue the decoded instruction to a computation unit for executing the decoded instruction, an instruction completion control unit for obtaining an instruction execution result of the computation unit and for performing control for updating the register set on the basis of the execution result, and a data transfer control unit for controlling data transfer from the master register to the work register.

Preferably, a data transfer control unit includes a flag generation unit for receiving a work register rewrite request signal output for each of the threads from the instruction completion unit, generating a flag instructing starting of LOAD-CWP process of the thread specified by the work register rewrite request signal and outputting the flag to a data transfer timing control unit in order to perform a process of rewriting data in a work register for each of the threads, a data transfer control counter for counting cycles for data transfer on the basis of the flag, a data transfer timing control unit for controlling data transfer at a prescribed timing on the basis of the flag and cycles of the data transfer, and an instruction issue inhibition control unit for outputting, on the basis of the cycles for the data transfer, an instruction inhibition signal for inhibiting the instruction during data transfer.

Preferably, the trap detection unit is provided with a data transfer request signal generation unit for detecting a trap for each of the threads so as to generate trap information, and for outputting to the data transfer control unit the trap information for each of the threads.

Preferably, when the work register rewrite request is issued from the instruction completion control unit and the trap detection unit in the same thread, the flag generation unit in the data transfer control unit provides an order of priority to the work register rewrite request signal, generates a flag instructing starting of a LOAD-CWP process of the thread specified by the work register rewrite request according to the order of priority, and outputs the flag to the data transfer timing control unit.

Preferably, the instruction completion control unit inhibits instruction commit until an instruction of a LOAD-CWP instruction by a different thread is completed when the instruction completion control unit is notified by the instruction inhibition signal that a process of rewriting data in a work register is being executed by a different thread when the thread that issued an instruction commit request exists.

Preferably, the information analysis unit inhibits decoding of the instruction when the instruction analysis unit receives the instruction inhibition signal from the same thread as the thread that issued an instruction decode signal when the instruction decode request has been issued.

The present invention is a method of controlling a register window for executing Simultaneous Multithreading, including an instruction analysis step for decoding an instruction read from a memory device as an instruction pipeline, an instruction issue control step for performing control to issue the decoded instruction to a computation unit for executing the decoded instruction, an instruction completion control step for obtaining an instruction execution result of the computation unit, and for performing, on the basis of the execution result of the computation unit, control for updating the register set in which a master register and a work register are provided for plural threads and which includes a data transfer bus shared between the threads for transferring data from the master register to the work register, and a data transfer control step for controlling data transfer from the master register to the work register.

Preferably, the data transfer control step includes a flag generation step for receiving a work register rewrite request output for each of the threads, and for generating a flag instructing starting of a LOAD-CWP process in the work register rewrite request thread in order to perform a LOAD-CWP process, which is a process of rewriting data of the work register for each of the threads, a data transfer control counter step for counting cycles for data transfer on the basis of the flag, a data transfer timing control step for controlling data transfer at a prescribed timing on the basis of the flag and cycles of the data transfer, and an instruction issue inhibition control step for inhibiting, on the basis of the cycles for the data transfer, the instruction during data transfer.

Preferably, a trap is detected for each of the threads so as to generate trap information, and the work register rewrite request is generated for each of the threads.

Preferably, the flag generation step in the data transfer control step provides an order of priority for each of the threads and generates a flag instructing starting of a LOAD-CWP process of the thread specified by the work register rewrite request based on the priority order.

Preferably, the instruction completion control step inhibits instruction commit until a LOAD-CWP instruction by a different thread is completed when it is reported that the LOAD-CWP process is being executed by a different thread when the thread that issued an instruction commit request exists.

Preferably, the instruction analysis step inhibits decoding of the instruction when the instruction inhibition was reported by the thread that issued an instruction decode request when the instruction decode request was issued.

According to the present invention, a data transfer bus for connecting a master register and a work register adopting a register window system is shared by threads, and thereby circuit areas can be reduced and interference of instruction executions with other threads caused by a conflict in accesses to registers between threads can be avoided.

BRIEF DESCRIPTION OF DRAWINGS

FIG. 2 is a block diagram illustrating an instruction pipeline;

FIG. 3 is a conceptual diagram illustrating the relationship between an MRF and a WRF;

FIG. 10 is a flowchart for operations executed when the LOAD-CWP process is executed.

DESCRIPTION OF EMBODIMENTS

In the examples below, explanations will be given for an information processing apparatus that adopts a register window system and performs Simultaneous MultiThreading (SMT).

An information processing apparatus according to the present example includes, for plural threads, a register set (general-purpose register or the like) consisting of a master register and a work register that are based on a register window system and are for holding computation results and data needed for computations.

The register sets are required to allow each thread to refer to the number of registers specified by the architecture. Further, the values in a master register assigned to each thread are not allowed to be updated by instructions given by other threads. Thus, a master register is prepared for each thread.

When only one work register is used, a work register has to be switched each time a different thread starts referring to the register so that a particular time is required to transfer data from a master register to a work register. This results in a great time loss in switching a work register and in referring to a register. Thus, a work register is multiplexed together with a master register, and the data transfer bus necessary for switching a work register is commoditization between threads. Also, data transfer that is necessary for reflecting computation results on a work register from a computation unit as instruction execution resources is performed by using the commoditized data transfer bus described above.

This configuration can reduce the area used for circuits.

Also, commoditization of a transfer bus connecting a master register and a work register prevents plural data transfers from being conducted simultaneously. Thus, control is performed so that plural requests to transfer data from a master register to a work register are not made simultaneously by threads.

Also, control is performed so that transferring of data from a master register to a work register does not coincide with the writing of computation results, which can otherwise result from the commoditization of a data transfer bus between the computation unit and a work register as well.

Specifically, data needs to be transferred from a master register to a work register when: a SAVE instruction, a RESTORE instruction, or a CWP switching instruction such as a WRCWP instruction is executed, a trap has occurred, or a DONE/RETRY instruction is executed. Control is performed so that those cases coincide between different threads in order to inhibit those cases from occurring during a data transfer process. Also, control is performed so that computation results or the like are not written to a work register during a data transfer process.

EXAMPLE 1

(Configuration)

Figure 1:
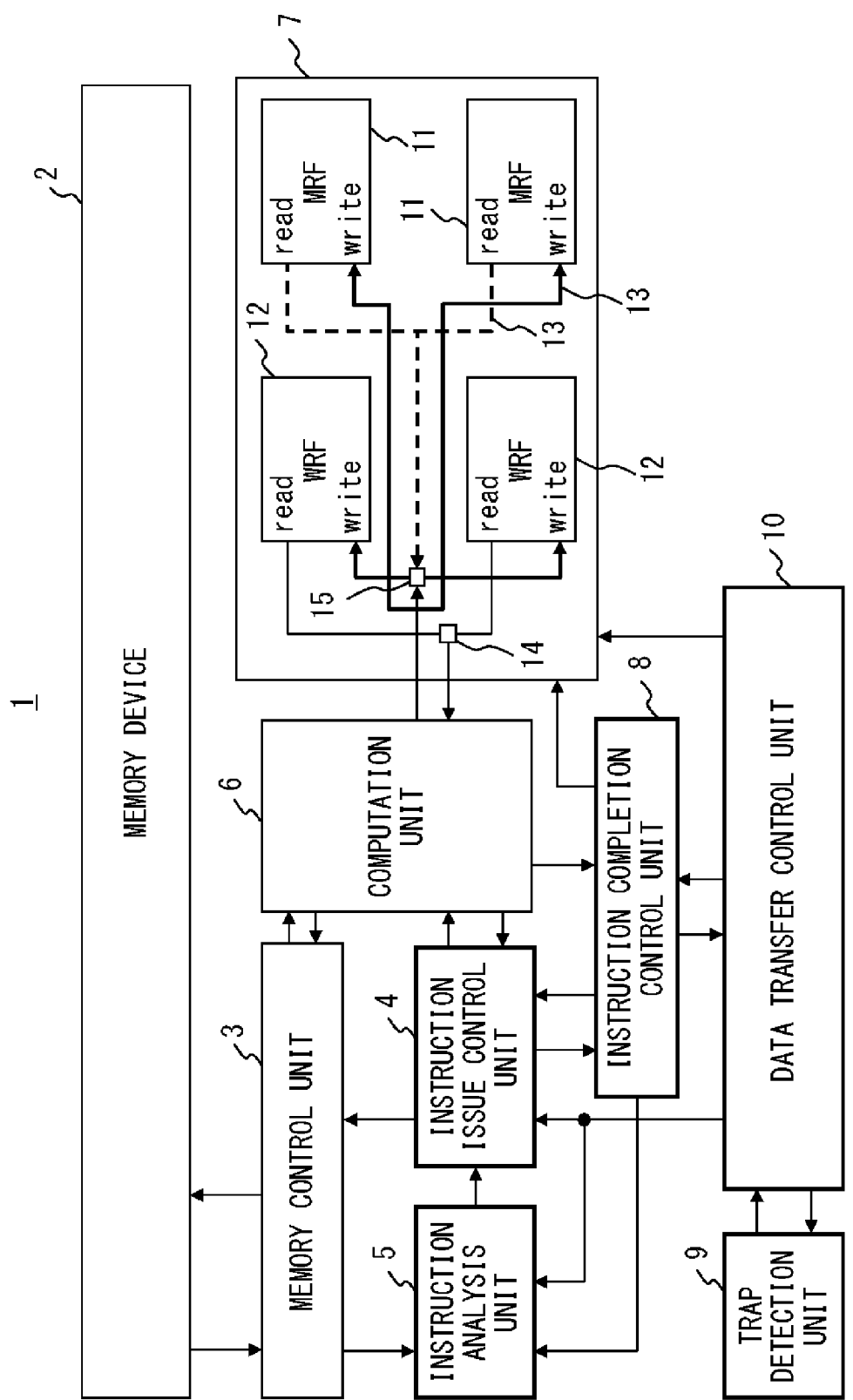
FIG. 1 is a block diagram illustrating a configuration of an information processing apparatus according to the present invention.

FIG. 1 is a block diagram illustrating a configuration of an information processing apparatus 1 such as a processor according to the present embodiment. The information processing apparatus 1 in example 1 illustrated in FIG. 1 includes a memory device 2, a memory control unit 3, an instruction issue control unit 4, an instruction analysis unit 5, a computation unit 6, a general-purpose register 7, an instruction completion control unit 8, a trap detection unit 9, and a data transfer control unit 10.

The memory device 2 functions as cache memory in the information processing apparatus 1. The memory control unit 3 controls the memory device 2 and the computation unit 6. The memory control unit 3 outputs, to the instruction analysis unit 5, codes (instructions) read from the memory device 2.

The instruction analysis unit 5 decodes codes provided from the memory control unit 3. The instruction issue control unit 4 controls issuing of instructions to resources that are used for performing processes corresponding to the decoded codes.

The computation unit 6 performs computations or the like on the basis of operands provided from the memory control unit 3 and the instruction issue control unit 4.

The general-purpose register 7 provides a master register 11 and a work register 12 for each thread, and is controlled by the data transfer control unit 10, the instruction completion control unit 8, etc.

The instruction completion control unit 8 is connected to the computation unit 6, the instruction issue control unit 4, the general-purpose register 7, and the data transfer control unit 10, and obtains from the computation unit 6 the results of executions of instructions corresponding to codes issued by the instruction issue control unit 4 in order to update the general-purpose register 7, cancel the inhibition condition in the instruction analysis unit 5 and the instruction issue control unit 4, and output a LOAD-CWP request for controlling the data transfer control unit 10, in accordance with the execution results.

The trap detection unit 9 detects a trap, and outputs to the data transfer control unit 10 a LOAD-CWP request (trap information of the trap detection unit 9).

The data transfer control unit 10 is connected to the trap detection unit 9, the instruction completion control unit 8, the instruction issue control unit 4, and the general-purpose register 7, and controls data transfer to the general-purpose register 7, and also controls types of transferred data, timings of transfer, and etc.

(Instruction Pipeline of Thread)

Next, FIG. 2 illustrates operations of each thread in the information processing apparatus 1. An instruction pipeline of a thread includes a Fetch stage, a Decode stage, a Dispatch stage, an Execute stage, an Update-Buffer stage, and a Commit stage.

The Fetch stage reads instructions from the memory device 2 on the basis of control performed by the memory control unit 3.

The Decode stage decodes instructions read from the memory device 2 by the instruction analysis unit 5.

The Dispatch stage issues, on the basis of control performed by the instruction issue control unit 4, instructions to instruction execution resources such as the computation unit 6.

The Execute stage executes, on the basis of instructions issued by the Dispatch stage, instructions issued in instruction execution resources such as the computation unit 6.

The Update-Buffer stage combines results of executing instructions in the Execute stage.

The Commit stage updates, on the basis of control performed by the instruction completion control unit 8, content in the memory device 2 and the general-purpose register 7 in the order of instructions and in accordance with the results of executing instructions in the Execute stage.

Among those stages, a Fetch stage, a Decode stage, and a Commit stage operate in an in-order manner; in other words, they operate in accordance with an execution order. By contrast, a Dispatch stage, an Execute stage, and an Update-Buffer stage operate in an out-of-order manner, which means that the order of data being processed starts with whichever piece of data is ready to be processed, regardless of the execution order.

(Register Set)

Next, the master register 11 and the work register constituting the general-purpose register 7 will be explained by referring to FIG. 3. FIG. 3 illustrates the relationship between the master register 11 and the work register 12.

The master register 11 (hereinafter, referred to as an MRF (Master Register File)) is composed of windows connected to form a ring. The MRF 11 is managed by a CWP (Current-Window-Pointer).

The work register 12 (hereinafter, referred to as a WRF 12 (Working Register File)) is composed of a window specified by a CWP and adjacent windows on both sides of that window.

Also, the WRF 12 includes a global register that can be used regardless of a CWP (global for normal, global for trap), a local register unique to each of the windows, an "in" register that allows overlaps between the windows, and an "out" register.

The MRF 11 and the WRF 12 are provided for each thread, and they are connected to each other by a data transfer bus 13 as illustrated in the general-purpose register 7 in FIG. 1 and a control bus (not illustrated). The data transfer bus 13 is controlled by bus-path switching performed by selectors 14 and 15. The switching may be controlled, for example, by the data transfer control unit 10 or the like, or may be controlled by providing circuits that are not illustrated.

The MRF 11 is composed of local registers (local 0 through local 7), in registers (in 0 through in 7), out registers (out 0 through out 7) for 8 windows, a global register (global for normal) of 8 words used for normal operations, and a global register (global for trap) of 8 words used for trap processing.

One of the windows in the MRF 11 is composed of a local register of 8 words, an in register of 8 words, and an out register of 8 words. Also, it is configured so that in (x) overlaps out (x+) of an adjacent window when CWP=x. For example, in (7) overlaps out (6) after the wrap around.

The WRF 12 for a thread is composed of 3 windows on the basis of the specification by a CWP, and is composed of 64 words in total, which consists of 8 words each for local (x−1), local (x), and local (x+1), 8 words each for in (x−1), in (x) and in (x+1), and 8 words for out (x−1), and 8 words for a global register.

A bus with a 16-word width, specifically 8 words for in and out registers and 8 words for local and global registers, is prepared for data transfer from the MRF 11 to the WRF 12, and this is shared by different threads so that data is transferred while switching, as necessary, between threads that occupy the data transfer bus 13.

(Window Switching Operation)

Switching of windows is performed when the values of a CWP change due to incrementing or decrementing of CWP and due to execution of an instruction to rewrite the values into arbitrary values that are not successive. Hereinafter, an instruction to increment a CWP is referred to as a SAVE instruction, an instruction to decrement a CWP is referred to as a RESTORE instruction, and an instruction to change a CWP into arbitrary values that are not successive is referred to as a WRCWP instruction.

The computation unit 6 is connected to the WRF 12 so that it can read data held in the WRF 12, and the computation unit 6 executes instructions specified by the data being held, SAVE instructions to increment a CWP, and RESTORE instructions to decrement a CWP.

In this example, the above instructions are executed in an out-of-order execution method.

Also, the computation unit 6 is connected to the MRF 11 and the WRF 12 so that it can write information to the MRF 11 and the WRF 12, and executes a writing process both to the MRF 11 and the WRF 12 simultaneously.

Hereinafter, a SAVE instruction, a RESTORE instruction, and WRCWP instructions will be explained.

When a SAVE instruction or a RESTORE instruction is being executed, the WRF 12 is composed of three windows specified by a CWP after movement. Specifically, when the register specified by a CWP before movement is x, the three windows x, x+1, and x+2 are used for a SAVE instruction, and the three windows x−2, x−1, and x are used for a RESTORE instruction. Because two of the three windows are already held by the WRF 12, only the data for the local register and in/out registers of one window, which is lacking, is required to be transferred from the MRF 11 to the WRF 12. Because the windows x+1 and x−1 are each already held by the WRF 12 for cases of SAVE and RESTORE instructions as data for the moved CWP, data reading can be executed without waiting for the data to be transferred from the MRF 11, i.e., without loss in time.

During the execution of a WRCWP instruction, when the register specified by the moved CWP is y, the WRF 12 is composed of the three windows y−1, y, and y+1. Because it is not guaranteed that data will still be held after a CWP has moved to the WRF 12 in the case of WRCWP, a local register and in/out registers that are necessary to compose the three windows based on window y are transferred from the MRF 11 to the WRF 12. During this, data reading from window y is not executable because the data cannot be referred to, and when the transfer has been completed, subsequent instructions are executed to the updated WRF 12.

Also, when a trap occurs during the execution of a process, the values in the register at the time when the trap occurred have to be held because values and operations that do not depend on normal operations are needed or because such values are needed for restarting the process. Thus, the global register is switched to one dedicated to a trap process so that a trap process is executed. For portions depending upon normal operations, in/out registers and local register are referred to.

When a trap process is performed, a particular instruction is executed, and the global register is again switched from the state for the trap process to the state for normal operations in order to restart the process. The portions necessary for normal operations are reflected through the in/out registers and the local register (an instruction executed upon the termination of a trap process is referred to as a DONE/RETRY instruction).

For example, a case is assumed where there are two threads, the number of threads in the same cycle is limited to one in issuing instructions, referring to registers, writing to registers, and completing instructions, and a CWP is changed by SAVE/RESTORE instructions in each cycle as necessary. Data transfer from the MRF 11 to the WRF 12 is executed after the completion of a change of a CWP by the SAVE/RESTORE instructions (Commit stage). At that time, the amount of data that needs to be transferred to the WRF 12 is 16 words, consisting of eight local words and eight in/out words, and that data is transferred in one cycle through the data transfer bus 13, which is 16 words in width. Instructions subsequent to the SAVE/RESTORE instructions in the same thread have to refer to rewritten data; however, they can refer to correct data without waiting for the completion of the data transfer because the WRF 12 also holds the window specified by the CWP and the adjacent windows. Also, even in a case when there is an instruction to update the WRF 12 (such as SAVE/RESTORE instructions and a WRCWP instruction) subsequent to the same thread, a conflict of transfer bus can be avoided because the data transfer can be completed in one cycle so that updating of WRF 12 is completed before issuing a request to update the WRF 12. Further, even when a request to update the WRF 12 is issued in next or subsequent cycles, a conflict of data bus is not caused because the data transfer has been completed in one cycle.

Next, a case in which a CWP is changed by a WRCWP instruction is described. Transfer of data from the MRF 11 to the WRF 12 is executed after the completion of a change of CWP by using a WRCWP instruction. In this, all data in the WRF 12 has to be rewritten to data of the windows based on the changed CWP, and accordingly the amount of data that needs to be transferred is 64 words, and the data is transferred in 4 cycles using a bus that is 16 words in width. This process of rewriting all data in the WRF 12 is herein referred to as a LOAD-CWP process.

Similarly to the case of SAVE/RESTORE instructions, subsequent instructions in the same thread have to refer to rewritten data, and accordingly correct data cannot be referred to until the completion of the data transfer. In this case as well, POST-SYNC control can inhibit subsequent instructions from referring to data before the completion of the execution of the instruction. Also, even when there is an instruction to update the WRF 12, which includes an instruction requiring a change of a CWP, after the SAVE/RESTORE instructions in the same thread, conflicts can be avoided because five stages are taken between the issue and completion of the subsequent instructions.

However, a LOAD-CWP process takes four cycles to be completed, and accordingly when issuing of subsequent instructions is restarted after the completion of an instruction, the LOAD-CWP process can still be in execution, which means that it cannot be guaranteed that data can be referred to. Accordingly, control has to be performed to inhibit subsequent instructions from being issued until the completion of a data transfer process even after the completion of the execution of an instruction.

When a trap has occurred, all operations being executed are cancelled, and thereafter data is transferred from the MRF 11 to the WRF 12. The amount of data that has to be transferred to the WRF 12 is 18 words for a global register. However, when a trap has occurred, it is necessary to cancel all instruction sequences for normal operations and thereafter fetch instruction sequences for a trap process from the memory device 2. This takes a substantial number of cycles because 3 stages, i.e., a Fetch stage, a Decode stage, and a Dispatch stage have to be performed for canceling instruction sequences for normal operations, fetching new instruction sequences, and referring to updated registers. This means that prompt updating of the WRF 12 is not necessary, and accordingly a LOAD-CWP process can be used instead of preparing a new logic, in order to transfer 8 words for a global register from the MRF 11 to the WRF 12 so that the logic is simplified and fewer resources are used.

Also, all operations of instructions that are being executed are cancelled when a trap has occurred, and accordingly there is no conflict with a request, based on an instruction in the same thread, to transfer data from the MRF 11 to the WRF 12 when a LOAD-CWP process is being performed or a LOAD-CWP process starts. However, traps occur irregularly, and thus there is a risk that a trap can occur during the execution of another LOAD-CWP process. This makes it necessary to perform control so that a conflict between LOAD-CWP processes caused by a trap in the same thread is avoided.

Also, a case of a DONE/RETRY instruction upon the termination of a trap process requires that instruction sequences for a normal process be fetched from the memory device 2 after the completion of the instruction, meaning that prompt updating of the WRF 12 is not necessary. Accordingly, in this case too, the updating of the WRF 12 is performed by a LOAD-CWP process.

Also, the data transfer bus 13 connecting the MRF 11 and the WRF 12 is shared by plural threads, while the data transfer bus 13 is occupied by one of them during a LOAD-CWP process. Accordingly, while a thread is executing a LOAD-CWP process, other threads cannot transfer data from the MRF 11 to the WRF 12. This means that control has to be performed so that while a thread is executing a LOAD-CWP process, other threads suspend a process of updating the MRF 11.

(Data Transfer Control Unit and Register Set)

Figure 4:
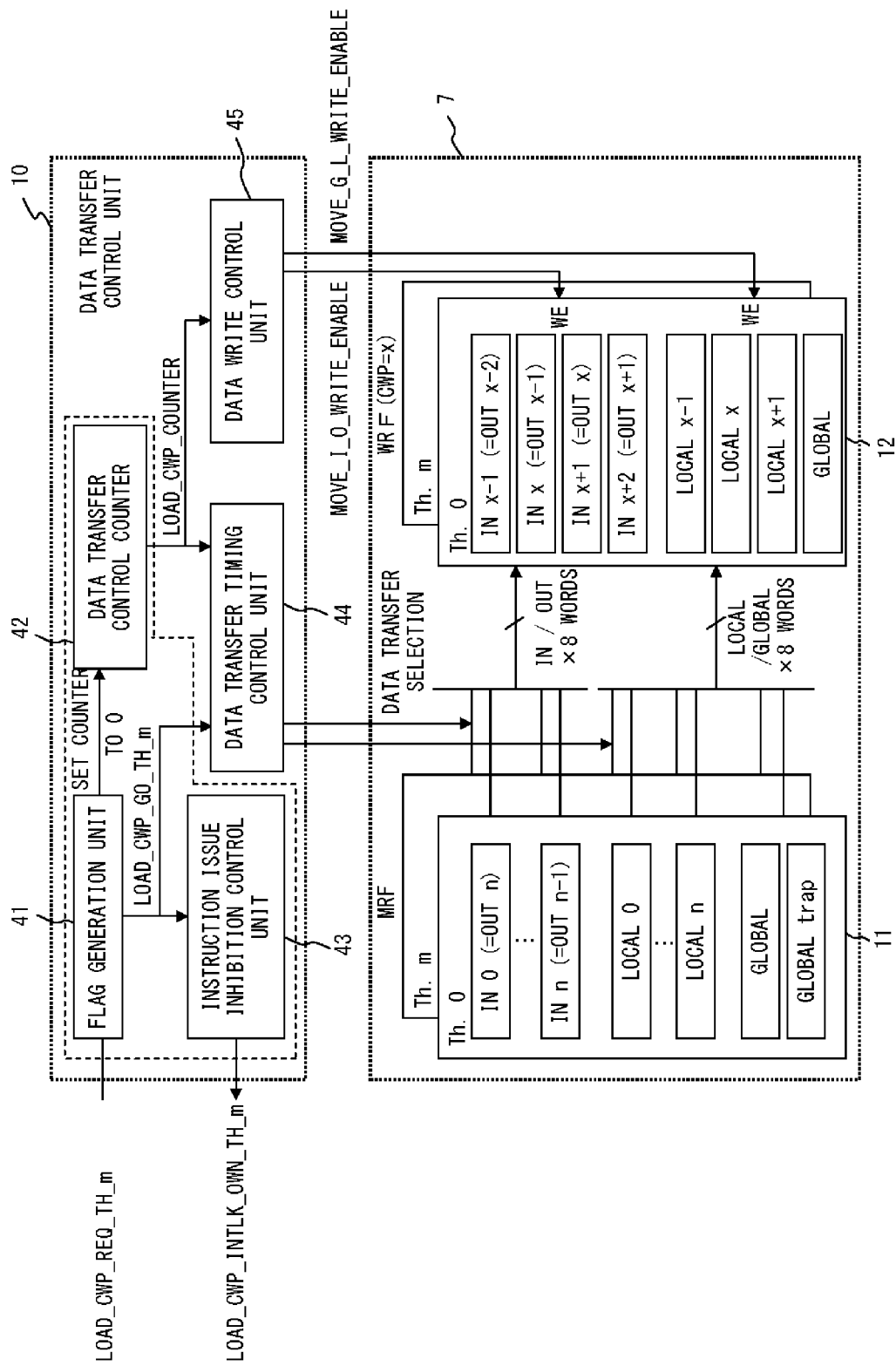
FIG. 4 is a block diagram illustrating configurations of a data transfer control unit and a general-purpose register.

FIG. 4 illustrates the data transfer control unit 10 according to the present example. The data transfer control unit 10 controls data transfer, performed by the general-purpose register 7, from the MRF 11 to the WRF 12. Specifically, the data transfer control unit 10 controls types of data transferred or timings of transfers, etc.

The data transfer control unit 10 includes a flag generation unit 41, a data transfer control counter 42, an instruction issue inhibition control unit 43, a data transfer timing control unit 44, and a data write control unit 45.

An instruction completion control unit 8 and a trap detection unit 9 are connected to the data transfer control unit 10.

In FIG. 4, m MRFs 11 and m WRFs 12 (Th 0 through Th m) are prepared for each thread, and each of Th 0 through Th m consists of 64 words total for local (8 words×3), in/out (8 words×4), and global (8 words).

For data transfer from the MRFs 11 to the WRF 12, the data transfer bus 13 that is 8 words total in width consisting of 4 words each for the in/out and the local/global. Accordingly, data of 8 words can be transferred in 1 cycle.

The flag generation unit 41 receives a LOAD-CWP request, on the basis of SAVE instructions, RESTORE instructions, and WRCWP instructions from the instruction completion control unit 8 and the trap from the trap detection unit 9 and the like and generates flags.

When a flag (LOAD_CWP_GO_TH_m) is generated by the flag generation unit 41, instruction issue inhibition control is performed by the instruction issue inhibition control unit 43 during data transfer from the MRF 11 to the WRF 12, and execution of subsequent instructions is inhibited. Also, when a flag has been generated by the flag generation unit 41, the counter value in the data transfer control counter 42 that has received the flag is set to zero, and the counting starts for the cycles required to transfer the data in accordance with the flag.

The data transfer timing control unit 44 performs control, in accordance with the flag and the counter value in the data transfer control counter 42, in order to determine at what timing data is to be transferred from the MRF 11 to the WRF 12 provided for each thread (transfer data selection). Specifically, it controls, while CWP=x, output of a signal for transferring data to the inx(=outx−1) register, a signal for transferring data to the inx+1(=outx) register, a signal for transferring data to the inx−1(=outx−2) register, a signal for transferring data to the inx+2(=outx+1) register, a signal for transferring data to the localx register, a signal for transferring data to the localx−1 register, a signal for transferring data to the localx+1 register, and a signal for transferring data to the global register.

The data write control unit 45 controls writing of data to the WRF 12. The data write control unit 45 outputs, on the basis of a counter value (LOAD_CWP_COUNTER) set by the data transfer control counter 42, WE (Write Enable) for controlling wiring, to the WRF 12, of data transferred from the MRF 11. This is a signal (MOVE_I_O_WRITE_ENABLE) for controlling the WRF 12 writing data to the in/out register or a signal (MOVE_G_L_WRITE_ENABLE) for controlling the WRF 12 writing data to the local/global register.

(Avoidance of Conflict in LOAD-CWP Process Between Threads)

Figure 5:
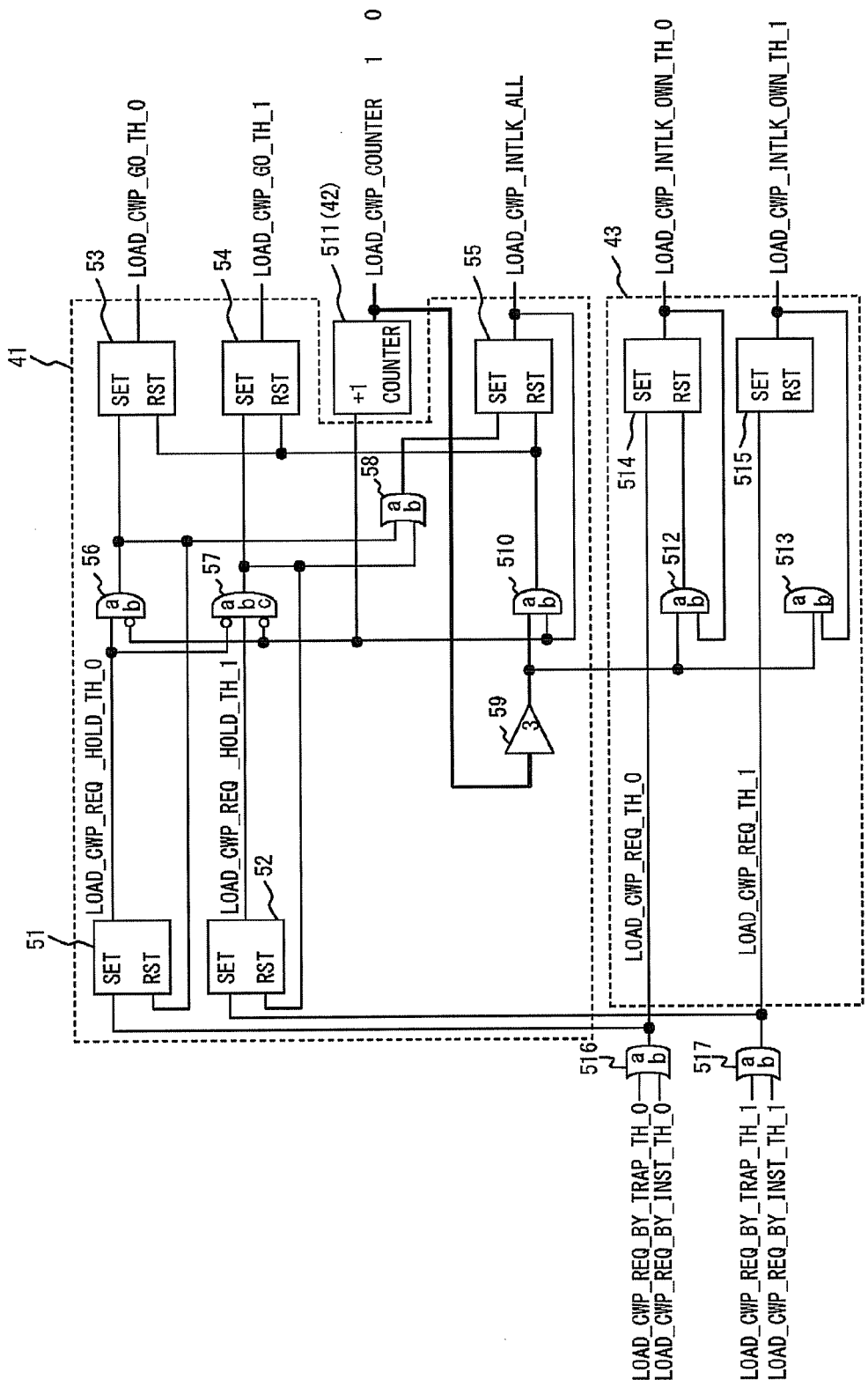
FIG. 5 illustrates circuit configurations of a flag generation unit, a data transfer control counter, and an instruction issue inhibition control unit.

FIG. 5 illustrates configurations of the flag generation unit 41, the data transfer control counter 42, and the instruction issue inhibition control unit 43. The flag generation unit 41, the data transfer control counter 42, and the instruction issue inhibition control unit 43 generate LOAD_CWP_INTLK_ALL, LOAD_CWP_INTLK_OWN_TH_0, and LOAD_CWP_INTLK_OWN_TH_1 in order to avoid a conflict in a LOAD-CWP process. The circuit illustrated in FIG. 5 is a circuit for a configuration where there are 2 threads and 2 SMTs (thread Th 0 and thread Th 1).

The flag generation unit 41 includes OR circuits 516 and 517 (2-input logical sum circuits), latch circuits 51 through 55, an AND circuit 56 (2-input logical product circuit), and another AND circuit 57 (3-input logical product circuit), another OR circuit 58 (2-input logical sum circuit), a comparator 59, and another AND circuit 510 (2-input logical product circuit).

LOAD_CWP_REQ_BY_INST_TH_0 and LOAD_CWP_REQ_BY_TRAP_TH_0 are input into the OR circuit 516 respectively from the instruction completion control unit 8 illustrated in FIG. 4 and the trap detection unit 9, and the OR circuit 516 generates LOAD_CWP_REQ_TH_0 (for thread Th 0) in accordance with those inputs. Also, LOAD_CWP_REQ_BY_INST_TH_1 and LOAD_CWP_REQ_BY_TRAP_TH_1 are input into the OR circuit 517, and the OR circuit 517 generates LOAD_CWP_REQ_TH_1 (for thread Th 1).

The output terminal of the OR circuit 516 is connected to the SET terminal of the latch circuit 51, and LOAD_CWP_REQ_TH_0 (for thread Th 0) is input into the SET terminal of the latch circuit 51. Also, the output terminal of the AND circuit 56 is connected to the RST terminal (reset terminal) of the latch circuit 51. Also, the output terminal of the latch circuit 51 is connected to the "a" input terminal of the AND circuit 56 and the "a" input terminal (inversion input) of the input terminal of the AND circuit 57.

The output terminal of the OR circuit 517 is connected to the SET terminal of a latch circuit 52, and LOAD_CWP_REQ_TH_1 is input into the SET terminal of the latch circuit 52. Also, the RST terminal (reset terminal) of the latch circuit 52 is connected to the output terminal of the AND circuit 57. The output terminal of the latch circuit 52 is connected to the "b" output terminal of the AND circuit 57.

The "b" input terminal (inversion input) of the AND circuit 56 is connected to the output terminal of the latch circuit 55, and is also connected to the "c" input terminal of the AND circuit 57 and the "b" input terminal of the AND circuit 510 (2-input logical product circuit). The output terminal of the latch circuit 55 is connected to the input terminal (+1) of a counter circuit 511 (data transfer control counter 42). The output terminal of the AND circuit 56 is connected to the SET terminal (set terminal) of a latch circuit 53.

The output terminal of the AND circuit 57 is connected to the SET terminal (SET terminal) of a latch circuit 54.

The output terminal of the AND circuit 56 and the "a" input terminal of the OR circuit 58 are connected to each other, and the output terminal of the AND circuit 57 and the "b" input terminal of the OR circuit 58 are connected to each other. The output terminal of the OR circuit 58 is connected to the SET terminal (set terminal) of the latch circuit 55.

The output terminal of the counter circuit 511 is connected to the input terminal of the comparator 59 through a bus that is 2 bits in width.

The output terminal of the comparator 59 is connected to the "a" input terminal of the AND circuit 510. The output terminal of the AND circuit 510 is connected to the RST terminal (reset terminal) of the latch circuit 55, and is also connected to the RST terminals respectively of the latch circuit 53 and the latch circuit 54.

LOAD_CWP_GO_TH_0 is output from the output terminal of the latch circuit 53 to the instruction issue inhibition control unit 43 and the data transfer timing control unit 44. LOAD_CWP_GO_TH_1 is output from the output terminal of the latch circuit 54 to the instruction issue inhibition control unit 43 and the data transfer timing control unit 44.

The instruction issue inhibition control unit 43 includes an AND circuit 512 (2-input logical product circuit), another AND circuit 513 (2-input logical product circuit), a latch circuit 514, and another latch circuit 515.

The "a" input terminal of the AND circuit 512 is connected to the output terminal of the comparator 59 and the "a" input terminal of the AND circuit 513.

LOAD_CWP_REQ_TH_0 (for thread Th 0) is input into the SET input terminal of the latch circuit 514. The output terminal of the latch circuit 514 is connected to the "b" input terminal of the AND circuit 512, and the output terminal of the AND circuit 512 is connected to the RST terminal (reset terminal) of the latch circuit 514.

LOAD_CWP_REQ_TH_1 (for thread Th 1) is input into the SET input terminal (set terminal) of the latch circuit 515. The output terminal of the latch circuit 515 is connected to the "b" input terminal of the AND circuit 513, and the output terminal of the AND circuit 513 is connected to the RST terminal (reset terminal) of the latch circuit 515.

In the configuration illustrated in FIG. 5, LOAD_CWP_INTLK_ALL, LOAD_CWP_INTLK_OWN_TH_0, and LOAD_CWP_INTLK_OWN_TH_1 are fixed to "high" while a LOAD-CWP process is executed. Also, by suppressing other LOAD-CWP requests while they are fixed in the "high" state, a conflict between LOAD-CWP processes is avoided.

LOAD_CWP_INTLK_ALL is a signal for avoiding a conflict between threads, is set to "high" at the same timing as a LOAD-CWP process starting instruction is given to the general-purpose register 7, and is reset to "low" after four cycles.

LOAD_CWP_INTLK_OWN_TH_0 and LOAD_CWP_INTLK_OWN_TH_1 are signals for avoiding a conflict in a thread, and when a LOAD-CWP request is received, these signals are set to "high", and after four cycles, they are reset to a "low". The timing of the resetting is determined by the fact that the effective cycle number of a LOAD-CWP process is always a fixed cycle number, 4, and the resetting timing of LOAD_CWP_INTLK can be changed even in a model with a different LOAD-CWP process effective cycle number because of differences in the transfer bus width or the amount of data transferred.

Conflicts between threads in LOAD-CWP processes are avoided by transmitting, by using LOAD_CWP_INTLK_ALL and to the general-purpose register 7, an instruction to start a LOAD-CWP process in a logic as illustrated in FIG. 5.

First, an explanation will be given for a case when a LOAD-CWP process request has been issued from thread Th 0.

The latch circuit 51 receives LOAD_CWP_REQ_TH_0 (LOAD-CWP process request for thread Th 0), sets LOAD_CWP_REQ_HOLD_TH_0 to "high", and checks LOAD_CWP_INTLK_ALL in the next cycle.

Specifically, when the output of the latch circuit 55 (LOAD_CWP_INTLK_ALL) is "low", the output of the latch circuit 53 (LOAD_CWP_GO_TH_0) controlled by the AND circuit 56 is set to "high". Then, LOAD_CWP_GO_TH_0 is transmitted from the output terminal of the latch circuit 53 to the general-purpose register 7 in the next cycle in order to start a LOAD-CWP process.

When LOAD_CWP_INTLK_ALL is "high", the AND circuit 56 performs control so that setting of LOAD_CWP_GO_TH_0 is inhibited, and thereby a conflict is avoided between threads in a LOAD-CWP process. Because "high" is input into the "b" input terminal of the AND circuit 56, "low" is output from the output terminal of the AND circuit 56, and is set in the latch circuit 53.

Because "low" is output from the AND circuit 56 while LOAD_CWP_GO_TH_0 as an output of the latch circuit 53 is being inhibited ("low"), the value of LOAD_CWP_REQ_HOLD_TH_0 is held by the latch circuit 51.

When a LOAD-CWP process that has been executed is completed, LOAD_CWP_INTLK_ALL becomes "low", and LOAD_CWP_GO_TH_0 is set to "high" in the next cycle so that LOAD-CWP processes are executed successively in thread 0 without a conflict.

Figure 9:
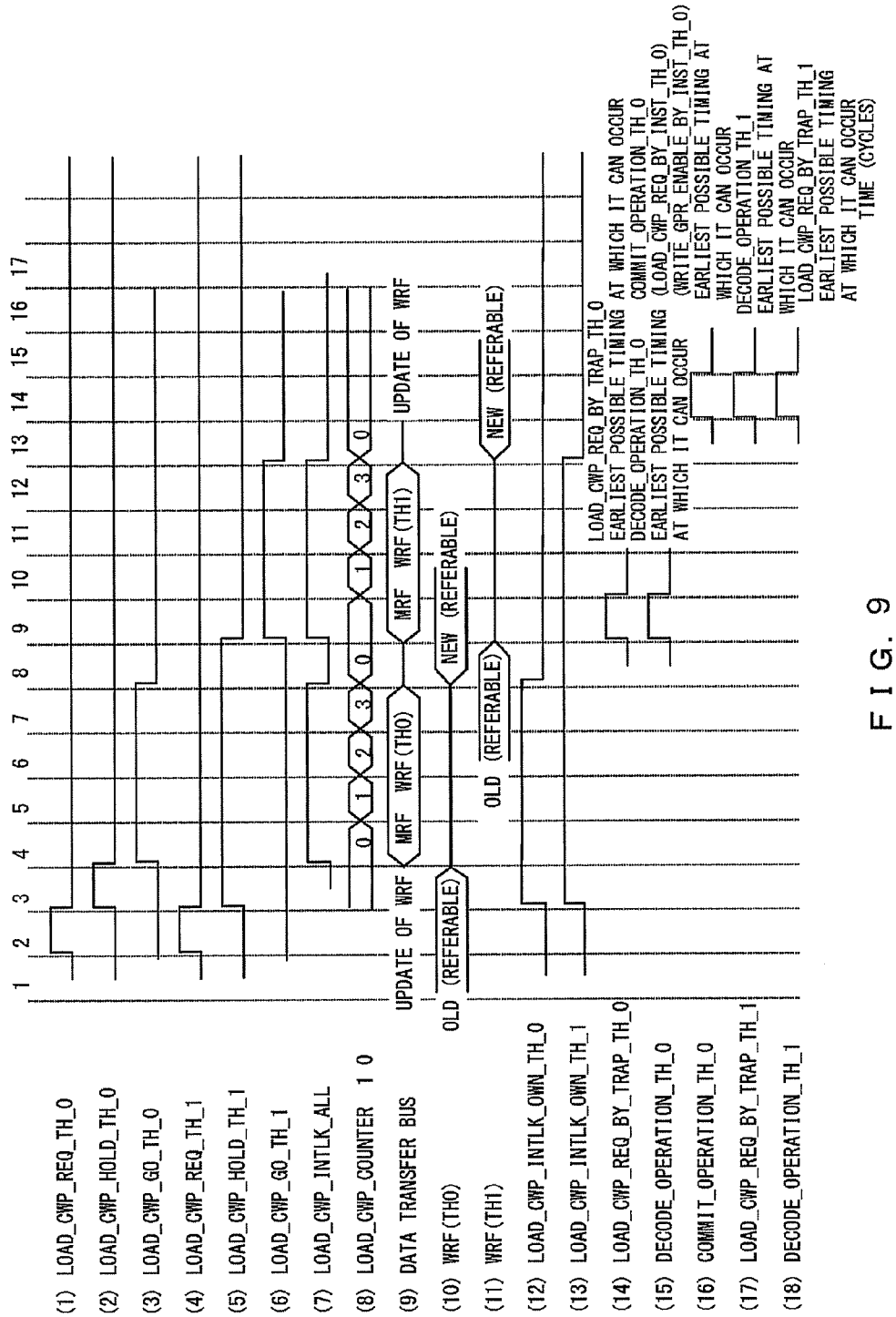
FIG. 9 illustrates a time chart illustrating operations to be performed when a LOAD-CWP process is executed.

In the present example, LOAD_CWP_GO_TH_0 as an output of the latch circuit 53 is set to "high" and an output of the AND circuit 56 becomes "high", and thereby LOAD_CWP_REQ_HOLD_TH_0 as an output of the latch circuit 51 is reset to "low" so that it can be ensured that threads selected by a LOAD-CWP process request are in order. Thereby, higher priority is given to the side of thread Th 0 (FIG. 9).

Next, explanations will be given for an example in which the side of thread Th 1 has issued a LOAD-CWP request.

The latch circuit 52 receives LOAD_CWP_REQ_TH_1 (LOAD-CWP process request from thread Th 1), sets LOAD_CWP_REQ_HOLD_TH_1 to "high", and checks LOAD_CWP_INTLK_ALL in the next cycle. When LOAD_CWP_INTLK_ALL is "low", the latch circuit 52 sets LOAD_CWP_GO_TH_1 to "high" in the latch circuit 54. In the Next cycle, the latch circuit 52 transmits LOAD_CWP_GO_TH_1 to the general-purpose register 7 in order to perform control so as to start a LOAD-CWP process.

When LOAD_CWP_INTLK_ALL is "high", the latch circuit 52 performs control so as to inhibit setting of LOAD_CWP_GO_TH_1 in order to avoid a conflict between threads in a LOAD-CWP process.

When setting of LOAD_CWP_GO_TH_1 is being inhibited, the value of LOAD_CWP_REQ_HOLD_TH_1 is held in the latch circuit 52. When a LOAD-CWP process that has been executed is completed, LOAD_CWP_INTLK_ALL becomes "low", and accordingly LOAD_CWP_GO_TH_1 is set to "high" so that LOAD-CWP processes in thread Th 1 can be executed successively without a conflict.

By resetting LOAD_CWP_REQ_HOLD_TH_1 to "low" and simultaneously setting LOAD_CWP_GO_TH_1 to "high", the order of LOAD-CWP process requests are secured between threads.

There is also a case when LOAD_CWP_REQ_TH_0 and LOAD_CWP_REQ_TH_1 are received at the same time. This occurs when LOAD_CWP_REQ_HOLD_TH_0 and LOAD_CWP_REQ_HOLD_TH_1 both become "high". In this case there is no order, and LOAD_CWP_GO_TH_0 is set to "high", giving priority to the side of thread Th 0, and thereby a conflict between threads can be avoided. As described above, simplification of logic can reduce the number of mounting areas.

In the present example, a case where there are two threads has been explained. However, even when there is a larger number of threads (Th 0 through Th m), a conflict can be avoided between threads in LOAD CWP processes by securing the order of LOAD_CWP_REQ_HOLD_TH_0 through LOAD_CWP_REQ_HOLD_TH_m.

(Avoidance of Conflict Between LOAD-CWP Processes in Same Thread)

As described above, a conflict can occur between requests for LOAD-CWP processes in the same thread when a LOAD-CWP process occurs due to a trap while another LOAD-CWP process is being executed. A conflict between LOAD-CWP processes in a thread caused by a trap can be avoided by a data transfer request signal generation unit 61 included in the trap detection unit 9 in FIG. 6 using LOAD_CWP_INTLK_OWN_TH_0 and LOAD_CWP_INTLK_OWN_TH_1 for transmitting to the instruction completion control unit 8 a request for a LOAD-CWP process.

First, an explanation will be given for a case when a trap has occurred on the side of thread Th 0.

Figure 6:
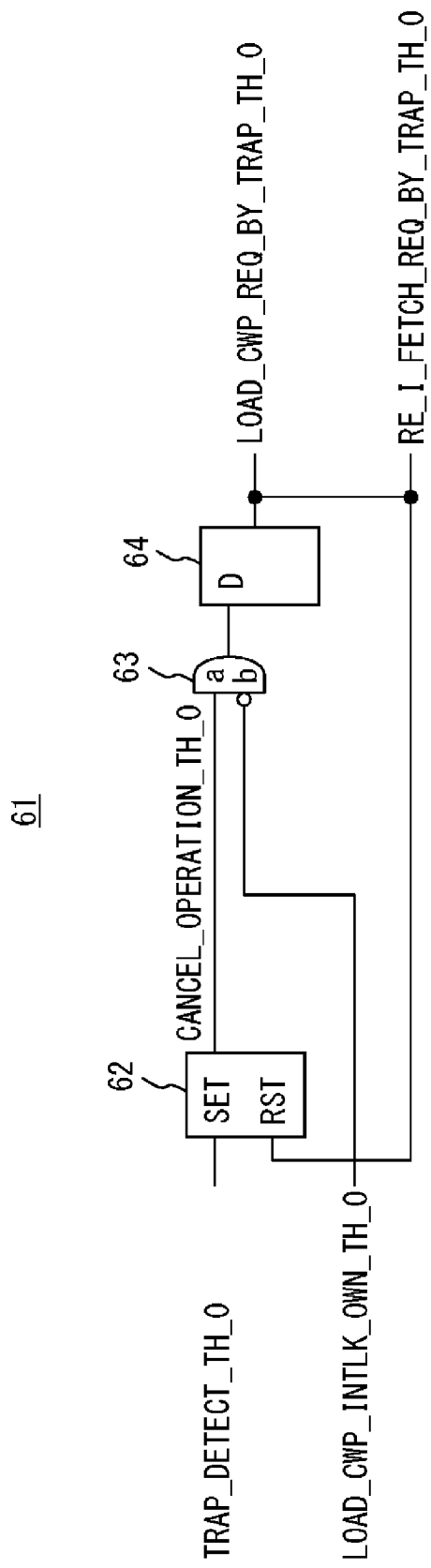
FIG. 6 illustrates a circuit that generates a data transfer request signal on the basis of a trap of a trap detection unit.

The data transfer request signal generation unit 61 on the side of thread Th 0 illustrated in FIG. 6 includes a latch circuit 62, an AND circuit 63 (2-input logical product circuit), and a flip-flop circuit 64.

When the trap detection unit 9 has detected a trap, it generates TRAP_DETECT_TH_0, and inputs it into the data transfer request signal generation unit 61.

The SET terminal of the latch circuit 62 is configured to receive TRAP_DETECT_TH_0. The output terminal of the latch circuit 62 is connected to the "a" input terminal of the AND circuit 63. LOA_CWP_INTLK_OWN_TH_0, which is output from the instruction issue inhibition control unit 43, is input into the "b" input terminal of the AND circuit 63 (inversion input). The output terminal of the AND circuit 63 is connected to the input terminal (D) of the flip-flop circuit 64. The output terminal of the flip-flop circuit 64 is connected to the RST terminal (rest terminal) of the latch circuit 62.

The latch circuit 62 receives TRAP_DETECT_TH_0 (trap detection from thread 0), and sets CANCEL_OPERATION_TH_0. The AND circuit 63 cancels all instructions that are being executed by the side of thread Th 0 in the cycle in which CANCEL_OPERATION_TH_0 became "high", and thereafter it checks LOAD_CWP_INTLK_OWN_TH_0.

The flip-flop circuit 64 sets LOAD_CWP_REQ_BY_TRAP_TH_0 to "high" when LOAD_CWP_INTLK_OWN_TH_0 is "low", and transmits it to the data transfer control unit 10. At the same time, the flip-flop circuit 64 outputs RE_I_FETCH_REQ_TH_0, and again starts fetching instruction sequences from the memory device 2. When LOAD_CWP_INTLK_OWN_TH_0 is "high", the flip-flop circuit 64 performs control so as to inhibit the setting of LOAD_CWP_REQ_BY_TRAP_TH_0 so that a conflict with a LOAD-CWP process that has already been executed in the same thread can be avoided.

By using LOAD_CWP_INTLK_OWN_TH_0, which has a set timing earlier than that of LOAD_CWP_INTLK_ALL, for inhibition of LOAD_CWP_REQ_BY_TRAP_TH_0, control is performed so that setting intervals of LOAD_CWP_REQ_HOLD_TH_0 are made to be longer and a single thread cannot occupy the execution of a LOAD-CWP process. In the present example, a case where there are two threads has been explained. However, even when there is a larger number of threads, employing a configuration that enables securement of the order of LOAD_CWP_REQ_HOLD_TM_m makes it possible to prevent a LOAD-CWP process of a thread from being in an unexecutable state for an unnecessarily long time.

A conflict between LOAD-CWP processes in a thread due to a trap on the side of thread Th 1 can be avoided by using a circuit configuration similar to the above thread Th 0 and performing control on the basis of LOAD_CWP_INTLK_OWN_TH_1 and TRAP_DETECT_TH_1 on the side of thread Th 1 as input signals in order to transmit, to the data transfer control unit 10, LOAD_CWP_REQ_BY_TRAP_TH_1, which is a request for a LOAD-CWP process.

(Avoidance of Reference to WRF Made by Subsequent Instructions in the Same Thread During Execution of LOAD-CWP).

Figure 7:
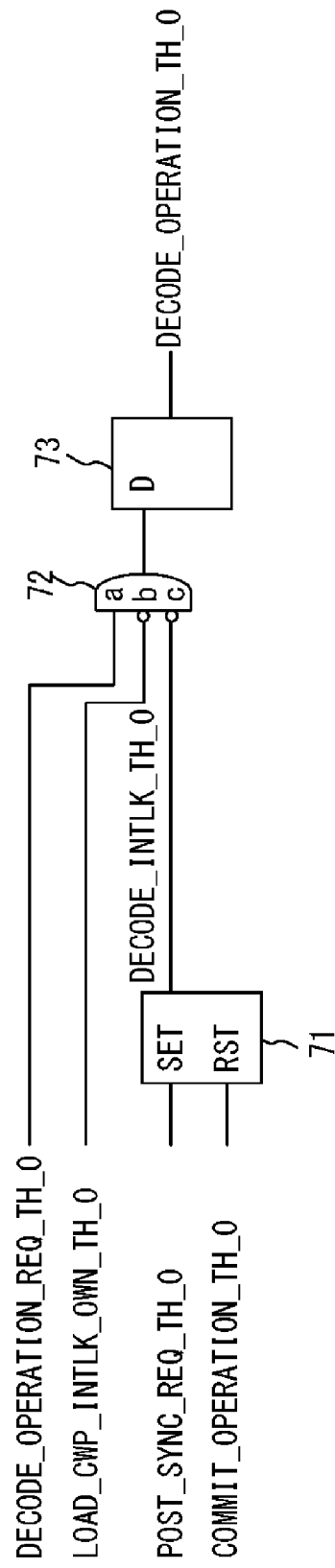
FIG. 7 illustrates a circuit of an instruction analysis unit.

Reference to WRF made by subsequent instructions in the same thread during the execution of a LOAD-CWP is avoided by using LOAD_CWP_INTLK_OWN_TH_0 and LOAD_CWP_INTLK_OWN_TH_1 to control instruction decodes by using the instruction analysis unit 5 illustrated in FIG. 7.

The instruction analysis unit 5 on the side of thread Th 0 illustrated in FIG. 7 includes a latch circuit 71, an AND circuit 72 (3-input logical product circuit), and a flip-flop circuit 73.

The SET input terminal of the latch circuit 71 recives an input of POST_SYNC_REQ_TH_0, which is an internal signal of the instruction analysis unit 5 and which becomes "high" when an instruction is specified by analysis to be instructions that require inhibition of decoding of subsequent instructions, such as a WRCWP instruction, as a result of decoding by means of the instruction analysis unit 5. COMMIT_OPERATION_TH_0, which is an output of the instruction completion control unit 8, is input into the RST terminal of the latch circuit 71. The output terminal of the latch circuit 71 is connected to the "c" input terminal of the AND circuit 72 (inversion input). DECODE_OPERATION_REQ_TH_0, which is an internal signal of the instruction analysis unit 5, is input into the "a" terminal, and LOAD_CWP_INTLK_OWN_TH_0, which is an output of the data transfer control unit 10, is input into the "b" input terminal (inversion input). The output terminal of the AND circuit 72 is connected to the input terminal (D) of the flip-flop circuit 73. The output terminal of the flip-flop circuit 73 is connected to the instruction issue control unit 4.

On the AND circuit 72 on the thread-Th 0 side, if LOAD_CWP_INTLK_OWN_TH_0 is "low" when an instruction decode request (DECODE_OPERATION_REQ_TH_0) is issued, instructions are decoded as they are. If LOAD_CWP_INTLK_OWN_TH_0 is "high", shifting to the Dispatch stage is avoided by inhibiting instruction decoding, and instructions that need LOAD-CWP processes are completed, and thereafter reference to WRF 12 made by subsequent instructions in the same thread during the execution of a LOAD-CWP is avoided.

Similarly to the thread Th 1 side, control is performed by using POST_SYNC_REQ_TH_1, COMMIT_OPERATION_TH_1, DECODE_OPERATION_REQ_TH_1, and LOAD_CWP_INTLK_OWN_TH_1, so that reference to WRF made by subsequent instructions in the same thread during the execution of a LOAD-CWP process can be avoided.

(Avoidance of Conflict between LOAD-CWP Process and Instruction to Update WRF in a Different Thread)

Avoidance of a conflict between a LOAD-CWP process and an instruction to update the WRF 12 in a different thread is realized by controlling an instruction commit by using the instruction completion control unit 8 that uses LOAD_CWP_INTLK_OWN_TH_0 and LOAD_CWP_INTLK_OWN_TH_1.

The instruction completion control unit 8 includes an AND circuit 81 (2-input logical product circuit), a flip-flop circuit 82, an AND circuit 83 (2-input logical product circuit), an AND circuit 84 (2-input logical product circuit), and an OR circuit (2-input logical sum circuit).

COMMIT_OPERATION_REQ_TH_0, which is a commit request output from the computation unit 6, is input into the "a" input terminal of the AND circuit 81 on the side of thread Th 0. LOAD_CWP_INTLK_OWN_TH_1, output from the data transfer control unit 10, is input into the "b" input terminal of the AND circuit 81 (inversion input). The output terminal of the AND circuit 81 is connected to the input terminal (D) of the flip-flop circuit 82.

The output terminal of the flip-flop circuit 82 is connected to the "a" input terminal of the AND circuit 84 and the "a" input terminal of the AND circuit 83.

The oldest instruction from among a SAVE instruction, a RESTORE instruction, and a WRCWP instruction, in other words, LOAD_CWP_INST_EQ_OLDEST_TH_0, which specifies the instruction that is to be committed next, is input from the instruction issue control unit 4 to the "b" input terminal of the AND circuit 83. LOAD_CWP_REQ_BY_INST_TH_0, output from the AND circuit 83, is output to the data transfer control unit 10.

To the "b" input terminal of the AND circuit 84, a signal specifying that an instruction that executes an update of GPR, such as an ADD instruction (addition), a SUB instruction (subtraction), or a LOAD instruction (data read from memory), is the instruction to be committed next (WRITE_GPR_INST_EQ_OLDEST_TH_0) is input. Output of the AND circuit 84 (WRITE_GPR_ENABLE_BY_INST_TH_0) is a write-enable signal connected to the WRF 12 for thread Th 0 in the general-purpose register 7.

The AND circuit 84 commits instructions as they are and rewrites the general-purpose register 7 with WRITE_GPR_ENABLE_BY_INST_TH_0 being issued if LOAD_CWP_INTLK_OWN_TH_1 is "low" when an instruction that needs rewiring of the general-purpose register 7 on the side of the thread Th 0 (WRITE_GPR_INST_EQ_OLDEST_TH_0) and a commit request (COMMIT_OPERATION_REQ_TH_0) occurred.

In the AND circuit 83, instructions are committed as they are when an instruction commitment request is issued by LOAD_CWP_INST_EQ_OLDEST_TH_0 and LOAD_CWP_INTLK_OWN_TH_1 is "low", and LOAD_CWP_REQ_BY_INST_TH_0 is issued. Thereafter LOAD_CWP_REQ_TH_, which is the result of an OR operation between LOAD_CWP_REQ_BY_INST_TH_0 and LOAD_CWP_REQ_BY_TRAP_TH_0, is output from the instruction completion control unit 8, and a LOAD-CWP process starts.

When LOAD_CWP_INTLK_OWN_TH_1 is "high" in the AND circuit 81, other threads are prevented from rewriting WRF 12 until a LOAD-CWP process is completed by inhibiting an instruction commit.

Similarly to the side of thread Th 1, a conflict between a LOAD-CWP process and in an instruction to update the WRF 12 given by other threads can be avoided by using COMMIT_OPERATION_REQ_TH_1 and LOAD_CWP_INTLK_OWN_TH_0.

When LOAD_CWP_INTLK_OWN_TH_0 is "high", it is not possible that an instruction requiring rewriting of the general-purpose register 7 is committed in thread Th 0 in order to prevent decoding of subsequent instructions. Thus, by utilizing the fact that the operations will not be influenced when an OR (logical sum) of LOAD_CWP_INTLK_OWN_TH_0 and LOAD_CWP_INTLK_OWN_TH_1 inhibits the committing of both threads, a configuration can be used in which the inhibition logic of a commit is simplified into an OR (logical sum) of LOAD_CWP_INTLK_OWN_TH_m of all threads even when the number of threads has increased.

(Operation Timing During LOAD-CWP Process)

FIG. 9 illustrates a time chart illustrating operations of a LOAD-CWP process.

In FIG. 9, the vertical axis represents the waveforms of (1) LOAD_CWP_REQ_TH_0, (2) LOAD_CWP_REQ_HOLD_TH_0, (3) LOAD_CWP_GO_TH_0, (4) LOAD_CWP_REQ_TH_1, (5) LOAD_CWP_REQ_HOLD_TH_1, (6) LOAD_CWP_GO_TH_1, (7) LOAD_CWP_INTLK_ALL, (8) LOAD_CWP_COUNTER, (9) data transfer bus (MRF→WRF), (10) WRF(Th 0), (11) WRF(Th 1), (12) LOAD_CWP_INTLK_OWN_TH_0, (13) LOAD_CWP_INTLK_OWN_TH_1, (14) LOAD_CWP_REQ_BY_TRAP_TH_0, (15) DECODE_OPERATION_TH_0, (16) COMMIT_OPERATION_TH_0, (17)

LOAD_CWP_REQ_BY_TRAP_TH_1, and (18) DECODE_OPERATION_TH_1. The horizontal axis represents the time axis (cycle numbers).

In the first cycle, (9) data transfer bus 13 is not occupied by any threads. It is possible to refer to currently held data of (10) WRF (Th 0) and (11) WRF (Th 1).

In the second cycle, (1) LOAD_CWP_REQ_TH_0 and (4) LOAD_CWP_REQ_TH_1 occur simultaneously in the instruction completion control unit 8, and the signal is output to the data transfer control unit 10.

In the third cycle, (1) LOAD_CWP_REQ_TH_0 "high" and (4) LOAD_CWP_REQ_TH_1 "high" are obtained and latched respectively by the latch circuit 51 and the latch circuit 52 in the flag generation unit 41 of the data transfer control unit 10, and (2) LOAD_CWP_REQ_HOLD_TH_0 and (5) LOAD_CWP_REQ_HOLD_TH_1 become "high". At this moment, (7) LOAD_CWP_INTLK_ALL is "low".

(2) LOAD_CWP_REQ_HOLD_TH_0 "high" and (7) LOAD_CWP_INTLK_ALL "low" are input into the AND circuit 56, and "high" is output from the output terminal of the AND circuit 56 so that "high" is set in the latch circuit 53.

(2) LOAD_CWP_REQ_HOLD_TH_0 "high", (5) LOAD_CWP_REQ_HOLD_TH_1 "high", and (7) LOAD_CWP_INTLK_ALL "low" are input into the input terminal of the AND circuit 57, and "low" is output from the output terminal of the AND circuit 57 so as to be input into the RST terminal of the latch circuit 52, and (5) LOAD_CWP_REQ_HOLD_TH_1 "high" is held.

Because output from the AND circuit 56 is "high", "high" is output to the SET terminal of the latch circuit 55.

(1) LOAD_CWP_REQ_TH_0 "high" is input into the latch circuit 514. (4) LOAD_CWP_REQ_TH_1 "high" is input into the latch circuit 515.

In the fourth cycle, because (7) LOAD_CWP_INTLK_ALL is "high" and (2) LOAD_CWP_REQ_HOLD_TH_0 is "low", the output of the AND circuit 56 is "low". At this moment, (8) LOAD_CWP_COUNTER is reset to "0".

In the fifth through seventh cycles, counting is performed in the counter circuit 511 until (8) LOAD_CWP_COUNTER becomes "3", "low" is output from the comparator 59 while the counter value is between 0 and 2 inclusive, and when the counter value has become 3, the output of the comparator 59 becomes "high". The outputs of the latch circuit 53 and the latch circuit 55 are held as they are, "high". The data transfer bus 13 is occupied by the WRF 12 from the MRF 11 of thread Th 0.

When the counter value has become "3", the output of the AND circuit 510 becomes "high", and the output of the (7) LOAD_CWP_INTLK_ALL becomes "low".

In the eighth cycle, the data transfer bus 13 is released from thread Th 0.

In the ninth cycle, the output of (7) LOAD_CWP_INTLK_ALL becomes "low", and thereby (5) LOAD_CWP_REQ_HOLD_TH_1 also becomes "low". At this moment, (8) LOAD_CWP_COUNTER is reset to "0".

As explained by referring to FIG. 6, the data transfer request signal (14) LOAD_CWP_REQ_BY_TRAP_TH_0 is generated in the trap detection unit 9 by a trap in thread Th 0 in the ninth cycle at the earliest.

As explained by referring to FIG. 7, (15) DECODE_OPERATION_TH_0 of subsequent instructions in the same thread is generated by the instruction analysis unit 5 and WRF is referred to in the ninth cycle at the earliest.

In the tenth through twelfth cycles, (8) LOAD_CWP_COUNTER is counted until it becomes "3" in the counter circuit 511, the output of the comparator 59 is "low" while the counter value is between 0 and 2 inclusive, and when the counter value becomes 3, the output of the comparator 59 becomes "high". The outputs of the latch circuit 54 and the latch circuit 55 are held as they are, "high". The data transfer bus 13 is occupied by the MRF 11 and the WRF 12 in the thread Th 1.

When the counter value has become "3", the output of the AND circuit 510 becomes "high" and the output of (7) LOAD_CWP_INTLK_ALL becomes "low".

In the thirteenth cycle, (8) LOAD_CWP_COUNTER is reset to "0". The data transfer bus 13 is released from thread Th 1.

Figure 8:
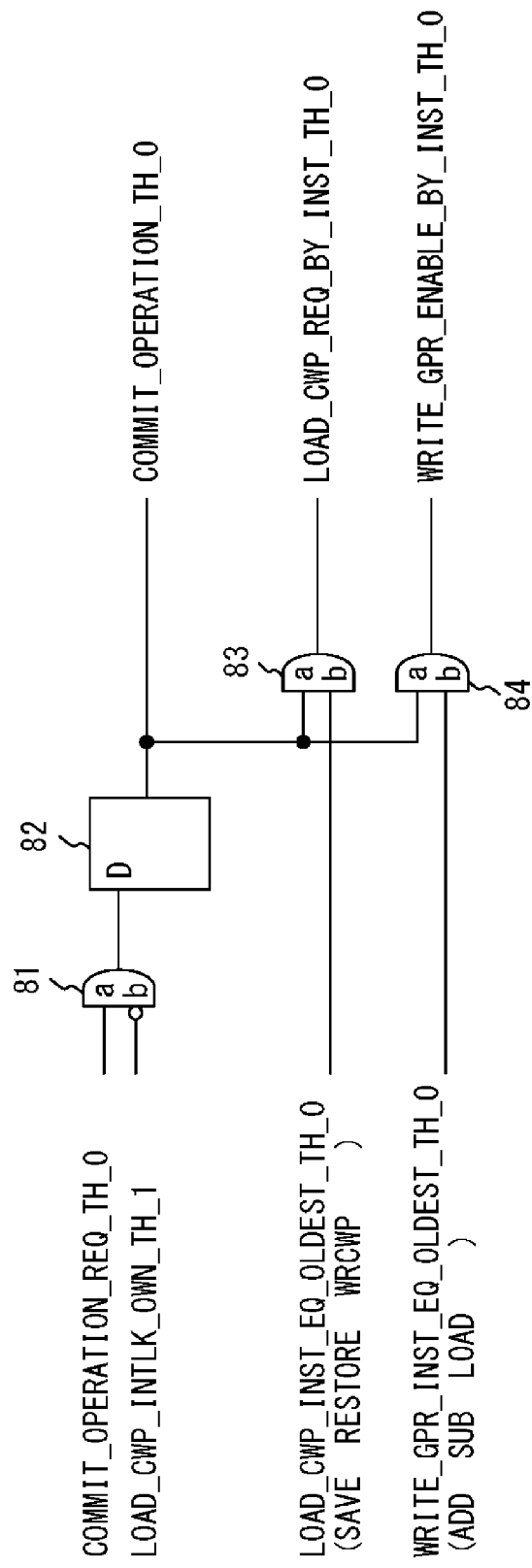
FIG. 8 illustrates a circuit of an instruction completion control unit.

As explained in FIG. 8, (16) COMMIT_OPERATION_TH_0 is generated in the instruction completion control unit 8 and a LOAD-CWP process and a request to update the WRF of other threads are output in the fourteenth cycle at the earliest.

As explained in FIG. 6, a data transfer request signal (14) LOAD_CWP_REQ_BY_TRAP_TH_1 is generated in the trap detection unit 9 by a trap in thread Th 1 in the fourteenth cycle at the earliest.

As explained in FIG. 7, (15) DECODE_OPERATION_TH_1 of subsequent instructions in the same thread is generated in the instruction analysis unit 5 and refers to the WRF in the fourteenth cycle at the earliest.

(Operation Flow of LOAD-CWP Process)

Next, an explanation will be given for the operation flow of a LOAD-CWP process illustrated in FIG. 10.

In step S101, an instruction is fetched (Fetch stage). Specifically, an instruction is read from the memory device 2.

In step S102, it is determined whether or not POST_SYNC_REQ_TH_m, which is a request signal of POST-SYNC control and LOAD_CWP_INTLK_OWN_m, is in effect. When the determination is Yes, the process loops after step S102. Otherwise, the process proceeds to step S103. For example, in thread Th 0, the instruction analysis unit 5 performs determination on the basis of POST_SYNC_REQ_TH_0 and LOAD_CWP_INTLK_OWN_0.

In step S103 (instruction analysis step), instructions are decoded by the instruction analysis unit 5 (Decode stage). When the instruction is a WRCWP instruction, the process proceeds to step S105. When the instruction is not a WRCWP instruction, the process proceeds to step S104.

In step S104, instructions are given and executed. In other words, a Dispatch stage issues an instruction to the computation unit 6 (instruction execution resources) (instruction issuing step). Also, an Execute stage executes instructions in the computation unit 6. Also, in the instruction completion control unit 8, the execution results are combined (Update-Buffer stage).

In step S105, instruction decoding in the same thread is inhibited (POST-SYNC control).

In step S106, whether or not LOAD_CWP_INTLK_OWN_m has occurred in other threads is determined, and if LOAD_CWP_INTLK_OWN_m has not occurred the process proceeds to step S107. When, it has occurred, a loop starts.

An explanation will be given for an instruction completion control step.

In step S107, the memory device 2 and the general-purpose register 7 are updated in accordance with execution results (Commit stage). If it is not a SAVE instruction, a RESTORE instruction, or a WRCWP instruction, i.e., when it is a normal instruction, the process proceeds to step S108. When it is a SAVE instruction or a RESTORE instruction, the process proceeds to step S109. When it is a WRCWP instruction, the process proceeds to S1011.

In step S108, resources are updated.

In step S109, a CWP is updated, and in step S1010, data is transferred from the MRF 11 of the corresponding thread to the WRF 12.

In step S1011, POST-SYNC control is cancelled, and a CWP is updated.

In step S1012, instruction decoding in the same thread is inhibited.

In step S1013, whether or not LOAD_CWP_INTLK_ALL is in effect is determined. When it is in effect, a loop starts. When it is not in effect, the process proceeds to step S1014.

In step S1014, a LOAD-CWP process starts, and LOAD-CWP processes of other threads are inhibited.

In step S1015, data is transferred from the MRF 11 to the WRF 12 of the corresponding thread.

In step s1016, it is determined whether or not LOAD_CWP_COUNTER, which is the counter value of the above data transfer control counter 42 (511), is "3". When it is "3", the process proceeds to step S1017.

In step S1017, the LOAD_CWP process is terminated. In other words, LOAD_CWP_INTLK_ALL, LOAD_CWP_INTLK_OWN_TH_0, and LOAD_CWP_INTLK_OWN_TH_1 are cancelled.

When a trap has occurred in step S1018, subsequent instructions that are being executed in the same thread are cancelled in step S1019, and whether or not LOAD_CWP_INTLK_OWN_TH_m is present is determined in step S1020. In the above example, it is 2SMT, and accordingly whether or not LOAD_CWP_INTLK_OWN_TH_0, which is in thread Th 0, has occurred is determined. When it has occurred, the process proceeds to step S1012. When it has not occurred, the process proceeds to step S1019.

By using the technique based on the present invention that has been described in detail, the mounting area can be reduced and a conflict between processes in commoditized resources can be avoided by hardware in order to realize SMT in general-purpose registers that employ a register window system.

The scope of the present invention is not limited to the above embodiments and various modifications and alterations are allowed without departing from the spirit of the present invention.

What is claimed is:

1. An information processing apparatus including a plurality of register windows including combinations of registers in order of in registers, local registers, and out registers, for executing Simultaneous MultiThreading, the information processing apparatus comprising:
a plurality of register windows each includes a master register and a work register provided for each of plural threads;
a data transfer bus shared between the threads and configured to transfer data from the master register to the work register;
an instruction analysis unit configured to decode an instruction read from a memory device;
an instruction issue control unit configured to perform control to issue the decoded instruction to a computation unit configured to execute the decoded instruction;
an instruction completion control unit configured to obtain an instruction execution result of the computation unit and to perform control for updating the register set on the basis of the execution result; and
a data transfer control unit configured to control data transfer from the master register to the work register, wherein the data transfer control unit comprises:
a flag generation unit configured to receive a work register rewrite request signal output for each of the threads from the instruction completion unit, to generate a flag instructing starting of a LOAD-CWP process of the thread specified by the work register rewrite request signal and to output the flag to a data transfer timing control unit in order to perform a process of rewriting data in a work register for each of the threads;
a data transfer control counter configured to count cycles for data transfer on the basis of the flag;
a data transfer timing control unit configured to control data transfer at a prescribed timing on the basis of the flag and cycles of the data transfer; and
an instruction issue inhibition control unit configured to output, on the basis of the cycles for the data transfer, an instruction inhibition signal for inhibiting the instruction during data transfer.

2. The information processing apparatus according to claim 1, further comprising:
a data transfer request signal generation unit configured to detect a trap for each of the threads so as to generate trap information, and to output to the data transfer control unit the trap information for each of the threads.

3. The information processing apparatus according to claim 2, wherein:
the instruction completion control unit generates a flag instructing starting of a process of rewriting data in a work register of the thread specified by the work register rewrite request signal so as to output the flag to a data transfer timing control unit when the trap and the work register rewrite request are issued by the thread.

4. The information processing apparatus according to claim 3, wherein:
the instruction analysis unit inhibits decoding of the instruction when the instruction analysis unit receives the instruction inhibition signal from the same thread as the thread that issued an instruction decode request signal when the instruction decode request, which is a request to decode an instruction, has been issued.

5. The information processing apparatus according to claim 2, wherein:
the instruction completion control unit inhibits instruction commit until an instruction of a process of rewriting data in a work register by a different thread is completed when the instruction completion control unit is notified by the instruction inhibition signal that a process of rewriting data in a work register is being executed by a different thread when the thread that issued a request for an instruction commit exists.

6. The information processing apparatus according to claim 1, wherein:
the flag generation unit provides an order of priority to the work register rewrite request signal output from the instruction completion control unit for each of the threads.

7. A method of controlling a register window for executing Simultaneous Multithreading, the method comprising:
decoding an instruction read from a memory device;
performing control to issue the decoded instruction to a computation unit for executing the decoded instruction;
obtaining an instruction execution result of the computation unit and performing, on the basis of the execution result of the computation unit, control for updating one of a plurality of register windows each includes a master register and a work register provided for each of plural threads; and controlling data transfer from the master register to the work register on a data transfer bus shared between the threads, wherein the controlling data transfer comprises:

receiving a work register rewrite request output for each of the threads, and generating a flag instructing starting of a process of rewriting data of the work register of the thread of the work register rewrite request in order to perform a process of rewriting data of the work register for each of the threads;

counting cycles for data transfer on the basis of the flag;

controlling data transfer at a prescribed timing on the basis of the flag and cycles of the data transfer; and inhibiting, on the basis of the cycles for the data transfer, the instruction during data transfer.

8. The method of controlling a register window according to claim 7, comprising:

detecting a trap for each of the threads so as to generate trap information, and generating the trap information for each of the threads.

9. The method of controlling a register window according to claim 8, wherein:

the performing control for updating comprises:

generating a flag instructing starting of a process of rewriting data in a work register of a thread of the work register rewrite request when the trap and the work register rewrite request were issued by the same thread.

10. The method of controlling a register window according to claim 9, wherein:

the decoding the instruction comprises:

inhibiting decoding of the instruction when there is notification of the instruction inhibition from the thread that issued the instruction decode request when the instruction decode request, which is a request to decode an instruction, has been issued.

11. The method of controlling a register window according to claim 8, wherein:

the performing control for updating comprises:

inhibiting instruction commit until an instruction of a process of rewriting data in a work register by a different thread is completed when the performing control for updating is notified that a process of rewriting data in a work register is being executed by a different thread when the thread that issued an instruction commit request exists.

12. The method of controlling a register window according to claim 7, wherein:

the generating the flag comprises:

providing an order of priority to the work register rewrite request for each of the threads.

* * * * *